United States Patent [19]

Beshai et al.

[11] Patent Number: 5,168,492
[45] Date of Patent: Dec. 1, 1992

[54] ROTATING-ACCESS ATM-STM PACKET SWITCH

[75] Inventors: Maged E. Beshai, Nepean; Ernst A. Munter, Kanata, both of Canada

[73] Assignee: Northern Telecom Limited, Montreal, Canada

[21] Appl. No.: 683,920

[22] Filed: Apr. 11, 1991

[51] Int. Cl.[5] .............................................. H04G 11/04
[52] U.S. Cl. ...................................... 370/60.1; 370/60
[58] Field of Search ........................ 370/60, 60.1, 58.1, 370/58.2, 58.3, 94.1, 94.2

[56] References Cited

U.S. PATENT DOCUMENTS

| | | |
|---|---|---|
| 4,470,139 | 9/1984 | Munter . |
| 4,884,264 | 11/1989 | Servel et al. ............................ 370/60 |
| 4,885,740 | 12/1989 | Parson et al. ........................... 370/60 |
| 4,905,225 | 2/1990 | Francois et al. ........................ 370/60 |
| 4,933,932 | 6/1990 | Quinquis et al. ....................... 370/60 |

OTHER PUBLICATIONS

Pending U.S. patent application Ser. No. 07/638,872 (Munter).
Published Canadian Patent Application Ser. Nos. 2,003,259* (Fukaya) May/90, 2,006,102* (De Somer) Jun./90, 2,006,392* (Lobjinski) Jun./90.
Published Japanese Patent Application Ser. Nos. J02/206,939 (Okamoto) Aug./90, J02/170,744 (Sumino) Jul./90, J02/142,240 (Uetake) May/90, J01/148,000 (Abe) Jun./89.
Publication entitled "Network, Transport, and Switching Integration for Broadband Communications"* by J. Y. Hui, IEEE Network, Mar. 1989, pp. 40-51.
Publication entitled "Input Versus Output Queueing on a Space-Division Packet Switch"* by M. J. Karol et al., IEEE Transactions on Communications, vol. COM-35, No. 12, Dec. 1987, pp. 1347-1356, * enclosed.

*Primary Examiner*—Douglas W. Olms
*Assistant Examiner*—Wellington Chin
*Attorney, Agent, or Firm*—Yoshiharu Toyooka

[57] ABSTRACT

A new architecture of an ATM or ATM/STM switching node which is functionally equivalent to the classical buffer-space-buffer (BSB) architecture is disclosed. In the basic embodiment, it uses middle packet buffers with a rotator (commutator) at its input and output. It has two main advantages over the BSB architecture. First of all, in the ATM mode, the need for arbitration when more than one inlet competes for the same outlet during the same time slot is eliminated. Each packet knows when to proceed without being aware of the competing packets. This greatly simplifies the switching-control mechanism. Secondary, the switch hardware complexity is reduced through the use of clock-driven rather than state-controlled cross points. The cross-point ratio is $4/\sqrt{n}$, where n is the number of inlets (outlets).

12 Claims, 7 Drawing Sheets

ROTATING-ACCESS ATM-STM PACKET SWITCH

FIELD OF THE INVENTION

The present invention generally relates to packet switching. In particular, the invention is directed to a new type of packet switches for ATM or ATM/STM applications. The switches of the present invention solve the output contention problem and are simpler in structure and control.

BACKGROUND OF THE INVENTION

Generally speaking, there are two basic methods of time-multiplexing in broadband communications. The STM (synchronous transfer mode) assumes a common time reference called a frame reference among the terminals and each slot in a frame reference (or simply frame) is dedicated to the communication between two terminals. The ATM (asynchronous transfer mode), on the other hand, has no such common time reference. In one form of the ATM, each terminal transports fixed length blocks of information called cells (fixed length cells) or packets (fixed length packets). Each packet carries a data field and a header field (or simply header), the latter of which forms the preamble of a packet and contains source address, destination address, control bits etc.. More detailed discussion on broadband multiplexing and switching technologies are found in "Network, Transport, and Switching Integration for Broadband Communications" by J.Y. Hui, in IEEE Network, March 1989, pp 40-51.

The simplest structure of a switching node connecting m inlets and n outlets is an m×n matrix. An SDS (space division switch) is a matrix switch. When an SDS is used for interconnecting transmission links that are time multiplexed in an STM format, its cross-point setting is reconfigured for each time slot. The SDS is therefore considered as time multiplexed, hence the name Time Multiplexed Switch (TMS). A TMS can easily be viewed as many SDSs in parallel along the time axis. In circuit switching used for STM links, the matrix structure has been implemented in various ways to form a fully connected network which also alleviates time slot mismatch and output contention problem. Examples of the matrix-based architectures are the S-T-S (space-time-space), the T-S-T (time-space-time) and more recently the single-stage-equivalent structure described in U.S. Pat. No. 4,470,139, issued on Sept. 4, 1984 (Munter), where each cross point is a time switch, resulting in a strictly non-blocking node.

These matrix structures have been considered for packet switching for ATM networks. However, the same problem of output contention for TMS arises, that is to say, due to the absence of scheduling, more than one packet may compete for a given outlet during the same time slot (packet duration). Naturally, only one would be transmitted and the rest must stay in their queues and repeat the attempt during the subsequent time slots. There may be several inlet packets competing for a smaller number of outlets and the control mechanism must resolve the contention during each time slot, which may be of the order of a microsecond or so.

The time switch in the three stage T-S-T configuration used for STM networks cannot solve this problem for ATM networks for two reasons. First, ATM is inherently an FCFS (first come first serve) network without a frame reference. Hence a packet on an input ATM link would have to wait until the output is available. Consequently, an FCFS waiting room via buffering, instead of buffering for the time switch, is necessary at the inputs. Second, the destination addresses of packets on an ATM link may not have the periodic structure inherent in an STM network.

According to J.Y. Hui referenced above, two major switching methodologies are currently known for interconnecting large numbers of ATM links. The first approach alleviates output contention, or contention anywhere in a multi-stage connection network, by extensively using FCFS buffering at the internal links of the switching network. The interconnection network used is often a variation of the banyan network. Therefore, contention is localized to switch nodes with buffering to hold contending packets. The second approach avoids the use of internal buffering but employs sorting as a switching mechanism for computing cross-point setting and resolving output contention. The interconnection network used is a Batcher sorting network placed before a banyan-type network.

Various techniques addressing these and other problems concerning ATM and STM are found in the following laid-open Canadian Patent Applications: No. 2,003,259, opened on May 25, 1990 (Fukaya et al), mentions a broadband ATM ISDN digital exchange which uses a modified banyan network with an identification bit in the cell header to indicate whether effective data is stored; No. 2,006,102, opened on Jun. 24, 1990 (De Somer), shows a communication switching system for STM and ATM cell streams using a multiplexer which samples streams in predetermined order and at frequencies equal to the sum of time slot frequencies; and No. 2,006,392, opened on Jun. 23, 1990 (Lobjinski et al), teaches a single-stage digital coupling network using ATM which allows a modular expansion to have a coupling matrix with pre-connection and end connection modules.

The following laid open Japanese Patent Applications can also be referred to for different techniques addressing similar problems: No. J02/206,939, opened on Aug. 16, 1990 (Okamoto), describes a self-routing distribution network for ATM. It is made up of unit switches and bypass devices. No. J02/170,744, opened on Jul. 2, 1990 (Sumino), teaches ATM digital switching equipment. The equipment has a switch matrix which returns cells to the input buffer when a collision occurs. No. J02/142,240, opened on May 31, 1990 (Uetake at al), describes ATM packet switching equipment. It has buffer memories from which packets are output according to the output priority code obtained from a priority set-up circuit. No. J01/148,000, opened on Jun. 9, 1989 (Abe et al), teaches time-division data switching for a data highway which is operable in ATM and STM.

OBJECTS OF THE INVENTION

It is therefore an object of the present invention to provide a packet switch which is simple in structure and control.

It is another object of the present invention to provide a packet switch which obviates the output contention problem.

It is yet another object of the present invention to provide a packet switch which is easily expandable in capacity.

It is further an object of the present invention to provide a packet switch which is operable for ATM links as well as ATM/STM links.

SUMMARY OF THE INVENTION

Briefly stated, a packet switching system of the present invention is for switching data contained in packets among m inlets and n outlets, m and n being integers. The system comprises m inlets, each having an input buffer and p packet buffers, p being an integer. Each of the packet buffers has n buffer locations, each of which in turn is able to hold one or more packets. It further includes an input rotator cyclically connecting the m inlets and the p packet buffers. Each of the n outlets has an output buffer and an output rotator cyclically connects the p packet buffers and n outlets. The $i^{th}$ outlet is only connected to the $i^{th}$ buffer location of each of the p packet buffers, as the output rotator cyclically connects p packet buffers and n outlets, where $i=1$ to n.

BRIEF DESCRIPTION OF THE DRAWINGS

For a complete understanding of the present invention and for further objects and advantages thereof, reference may now be made to the following description, taken in conjunction with the accompanying drawings, in which.

DETAILED DESCRIPTION OF THE PREFERRED EMBODIMENTS

A variety of switching structures have been proposed for the ATM operation. In the packet-mode counterpart of the T-S-T structure, the operation of the crosspoints of the space switch is not scheduled and the time switches are replaced by simple buffers. It is labelled here as the BSB (buffer-space-buffer) architecture.

Figure 1:
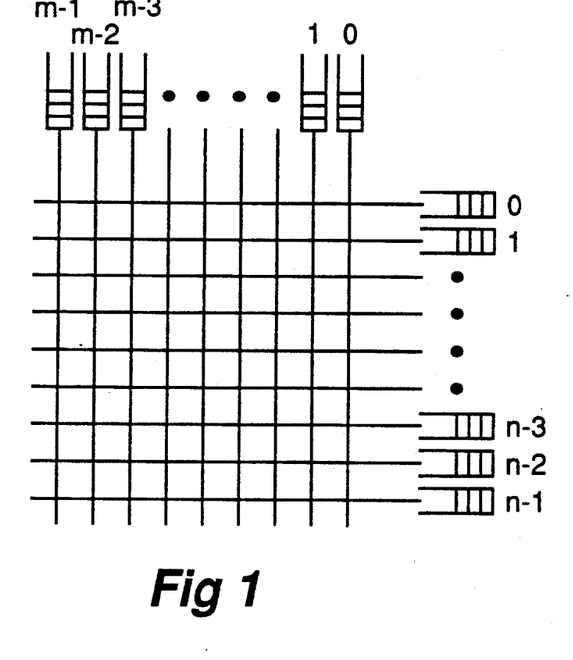
FIG. 1 is a buffer-space-buffer architecture according to the prior art.

FIG. 1 diagrammatically depicts such an architecture and shows m inlet buffers and n outlet buffers with a $m \times n$ matrix switch interconnecting the buffers. The cross-points are controlled by the destination indicated in the head of each packet. As in circuit switching, all the cross-points are operated synchronously. The packets are of equal size (length) and are synchronized at the inlets. Of course, this structure does not obviate the contention problem.

The need for contention controls can be eliminated altogether by a spatial disengagement of the destinations of all inlet packets. This can be realized by providing p packet buffers. These packet buffers would then, in effect, function as a space switch. The $i^{th}$ location in each packet buffer is dedicated to the $i^{th}$ outlet. Since an outlet can only receive one packet during a time slot, it must rotate to collect its packets from the p packet buffers. Also, in order to accommodate an arbitrary community of interest, the inlets must also rotate. This leads to the architecture of FIG. 2, which shows a basic embodiment of the present invention.

Figure 2:
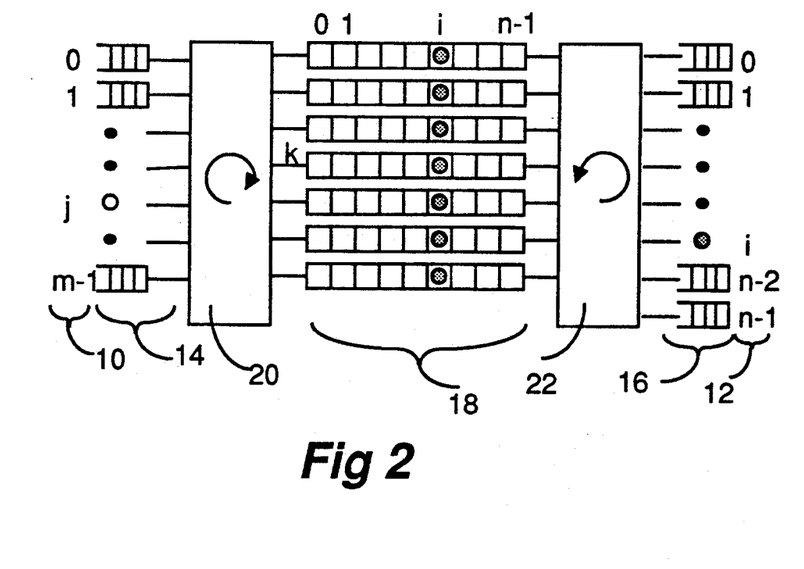
FIG. 2 is a schematic diagram of the new architecture according to the present invention.

Referring more closely to FIG. 2, there are schematically illustrated m inlets 10 and n outlets 12, each having an FIFO (first in first out) buffer. A set of the inlet buffers are designated by 14 and that of the outlet buffers by 16. A set of p packet buffers 18 is provided between a pair of rotators (or commutators) 20 and 22. m, n, and p are any positive integers. Each of the p packet buffers has n packet buffer locations. Each of the n packet buffer locations of each packet buffer is, in turn, specifically dedicated for connection to a particular outlet as the rotators cyclically interconnect discrete inlets and outlets with the packet buffers. Therefore, as the figure further shows in the way of an example, the $i^{th}$ outlet is always connected to its dedicated $i^{th}$ packet buffer location of each packet buffer, as the rotators synchronously make connections.

Packets arriving in an inlet are queued in a FIFO in a single queue. The output of the FIFO is connected to a particular packet buffer via the input rotator 20. By consulting the destination address in the header of a packet arriving from the inlet buffer through the input rotator, the packet buffer will try to accept the packet into the space indicated. If the space is free, the packet will be stored and a positive reply returned back through the rotator to the inlet buffer. The buffer will then remove the packet from its queue. If, on the other hand, the space in the packet buffer was occupied, a negative reply would be sent to the inlet buffer, which causes it to retain the packet in its queue, for retry in the next slot. The next slot occurs after one packet transmission period. The rotator is advanced one position so that each inlet is now connected to a different packet buffer. Each inlet queue again attempts to deliver the packet stored at the head of its queue to the packet buffer. The scheme guarantees the proper order of packet delivery for each ATM connection.

Simultaneously with the input phase in each cycle, there is an output phase. Through the output rotator, the packet buffer sends the packet stored in the buffer location that corresponds to the identity of the outlet presently connected. If that location was empty, an idle packet would be sent, otherwise the stored packet is sent and the location marked empty for future reference. If the operating speed of the switch matches that of the outgoing links, the packet can be sent directly out on the link without buffering. The two rotators are simple clock-driven selectors; they require no external controls, unlike the case of the standard space switch. Inlet j and outlet i connect to packet buffer k during the same time slot but neither the inlets nor the outlets need be aware of the identity of the packet buffer to which they are connected. Each rotator completes its cycle in m or n time slots.

The packet switch according to the present invention is operable with any positive number of the inlets, outlets and packet buffers. However, for the sake of simplifying the description, the discussion which follows mainly deals with the case where $m=n=p$. It is also more common that an inlet and an outlet are provided at each terminal (port), thus resulting in the same number of inlets and outlets in a switching system.

Let the cycle slots be numbered $0, 1, \ldots, (n-1)$. During cyclic slot 0, inlet j writes to buffer j in the location (outlet number) indicated by the head of the queue. During cyclic slot $\tau$, inlet j writes to buffer $(j+\tau)$ modulo n. Outlet i will only look at location i in the buffer at which it is connected during a given time slot. A packet written by inlet j, during cyclic slot $\tau$, is read by outlet i, in location i of a packet buffer, at cyclic time $(\tau+j-i+n)$ modulo n. The switching delay for a given inlet/outlet pair, from the head of the inlet queue to the outlet, is constant. During a given time slot several inlets may deliver to the packet buffers packets destined for the same outlet.

Figure 3:
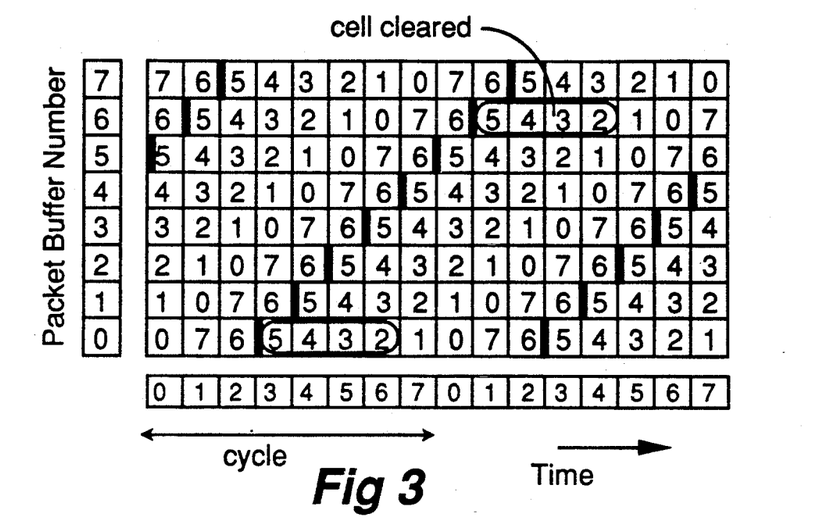
FIG. 3 is a graphic illustration of the operation of the present invention.

The process is illustrated in FIG. 3, where the entries in the space-time matrix indicate the inlet (or outlet) numbers. It is seen that between a certain inlet-outlet pair (j,i), inlet j is always preceded by $k=i-j$ other inlets which may attempt to communicate with the same outlet i by writing in the $i^{th}$ packet buffer location. Phase difference between inlet j and outlet i is $k=\mod(i-j+n,n)$. Inlet j and outlet i rotate together and outlets clear the cells. For example, inlet 5 (j=5) accesses packet buffer number 2 during cyclic slot $\tau=5$. If it succeeds in writing a packet destined to outlet 3 (i=3), then outlet 3 will read the packet during cyclic slot 7, and the delay in the packet buffer is 2 time slots (j-i). The packet buffer delay from inlet 3 (j=3) to outlet 5 (i=5) is 6 time slots (j-i+n).

Potentially, the delay can be reduced, and the throughput increased, by allowing another packet, if any, in the inlet queue to proceed to the packet buffer if the head packet is not able to do so. If the inlet buffer is inspected sequentially for a successful packet, starting from the head of the queue, the proper packet order is preserved for each connection. This approach of multiple-attempt per time slot would only be useful if the packet duration is significantly larger than the buffer access time (which would be the case if a parallel-series packet format is used). Allowing two attempts per time slot increases the capacity, for large n and pure ATM application, from 0.586 to 0.72. With exhaustive attempts, the capacity increases to 0.90 at the cost of added complexity in the controls.

The present architecture lends itself to the implementation of a large switch. Arbitrarily large rotator circuits for serial signals of very high speed can be built more economically than equivalent (non-blocking) space switches. With a 2:1 expansion, the switch becomes strictly non-blocking for the virtual connections, and the ATM streams experience a negligibly small delay, even at full inlet occupancy.

Figure 4:
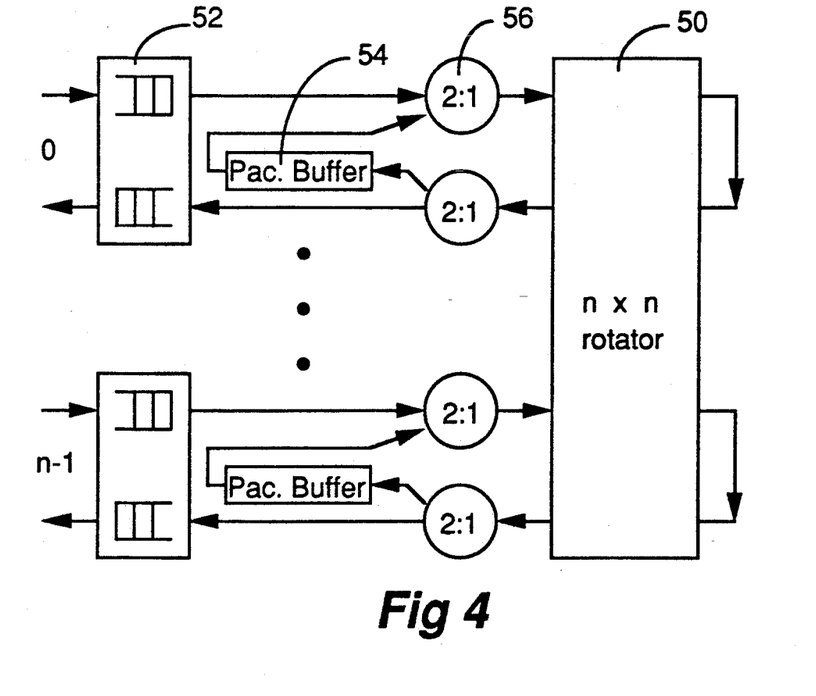
FIG. 4 is a schematic illustration of a multiplexed rotator according to another embodiment of the present invention.

FIG. 4 shows a further embodiment of the invention. In the case of m=n, a single (n×n) rotator 50 may be time multiplexed to function as the input and output rotators. Each of n port circuits 52 includes an inlet buffer and an outlet buffer. Appropriate packet buffers 54 and expansions 56 are also shown in the figure.

The fundamental speed or capacity limitation of the architecture derives from the need to inform the inlet circuits of success or otherwise of each packet delivery across the rotator into the packet buffers. This response must be obtained before the next packet is sent. If the next packet were sent (successfully) before confirmation (negative) of the previous delivery was received, packet order at the outlet could become scrambled. But this time constraint is not very serious. The packet buffer can determine from the header whether there is space for the packet. There is then almost a whole packet period to convey a single bit of information back to the port circuit. As the packet buffer is already connected back to the port circuit for output purposes, it is possible to piggy-back this acknowledgement bit on the header of the outgoing packet (including idle). Switch capacity is the product of link speed and number of ports. The speed/capacity limitation then boils down to a packaging question: how large a rotator can be built for a given packet rate, keeping in mind that synchronization, i.e. "simultaneous" operation of packet cycles at all ports must be assured.

In another embodiment, each packet buffer is provided with a FIFO per destination and not just with one location per destination. With this arrangement, the head of line blocking is eliminated in the inlet buffers (i.e. inlet buffers would not be needed). It can be considered as a multiple parallel output buffered switch. Of course, then the packet order cannot be guaranteed. However, compared to output or common buffer switches, this embodiment avoids the need for any very high speed bus or high connectivity, although an internal speed-up of two is probably advisable to eliminate the effect head of line blocking.

It may also be desirable to operate the switch at a faster cycle than the external line rates. This reduces head-of-line blocking in the inlet buffers, but it also requires that outlet buffers be provided for speed conversion.

Figure 5:
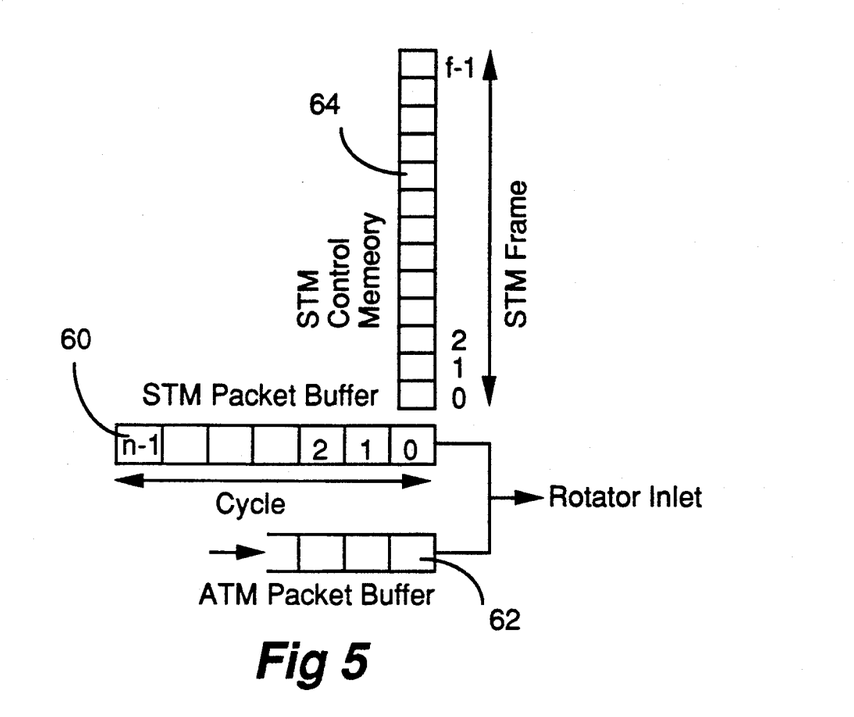
FIG. 5 is a schematic illustration of ATM/STM access operation according to yet another embodiment of the present invention.

The present architecture is readily expanded to provide a hybrid STM/ATM switching as well as pure ATM switching. One embodiment to achieve this is shown schematically in FIG. 5. Each inlet has an STM buffer 60 and an ATM buffer 62. The length of the STM buffer is n. Associated with the STM buffer 60 is a control memory 64 having f locations, f being the frame length (exactly as in classical circuit switching). The value of f need not bear any specific relationship to n. When the control memory prompts its STM buffer to transmit a packet, the associated ATM buffer is locked out during the time slot. The ATM and STM buffers need not be separate entities. The STM buffer stores full packets while its control memory stores only $\lceil \log_2 f \rceil$ address bits per cell, where $\lceil \ldots \rceil$ denotes rounding up. Thus for STM switching, packets would be assigned to synchronous channels and recur at a fixed rate. However, the cycle duration need not bear any rational relationship to the frame duration.

While using destination addresses and FIFO queues of the packet mode could certainly process and switch STM packets, changes in connections would cause shifts in relative timing, resulting in jitter. Rather than remove that jitter in a final dejittering circuit, it is possible to prevent it from the start by treating the switch as a TDM time-space-time switch. The input/output packet queues in the port circuits are redefined as time slot interchangers, controlled not on a first-come-first-serve basis, but rather through external connection memories. Similarly, the rotator/packet buffer combination can be seen as a non-blocking space switch if the packet buffers are understood as time switches. There is no need to clear packet buffers upon read, or to check whether space is available. By definition, packets are read at the same rate as they are written in STM mode, or, expressed differently, there cannot be collisions since no two input channels can be simultaneously connected to the same output channel. Connection control must ensure this. Since it is assumed that STM data is bundled into packets, it is possible to continue to use packet headers to control connections, i.e. there is no need for associating physical connection memories with the packet buffers. The address information can still be derived from headers that are created in the port circuits. Non-blocking for single connection can be achieved by 2:1 expansion, the same expansion that is required for non-blocking behavior in ATM packet mode. U.S. Pat. Application Ser. No. 07/638,872, filed on Jan. 11, 1991 by Munter (a co-inventor of the present invention) entitled "Common Memory Switch for Routing Data Signals" describes a different packet switch addressing the above aspects.

Figure 6:
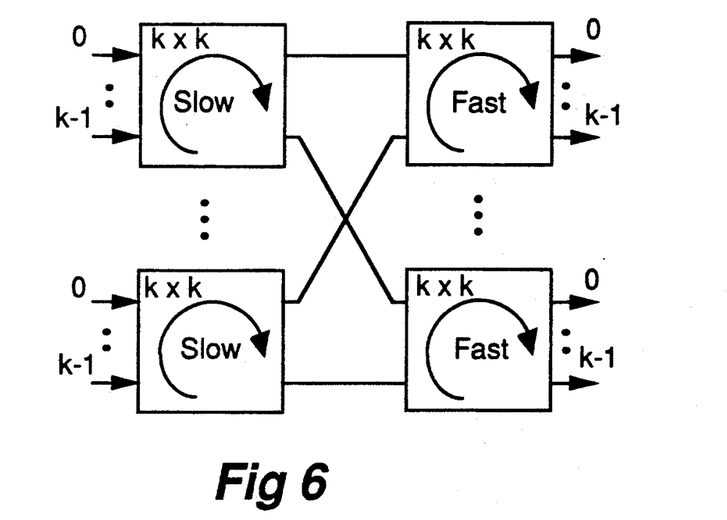
FIG. 6 shows a still further embodiment of the present invention for large networks.

For large networks, the n×n rotator can be implemented in two (or more) stages. FIG. 6 shows such an embodiment. Using units of smaller k×k rotators, where $k=\sqrt{n}$, the number of units required would be 2 k instead of $k^2$ (which would be needed for a square rotator). The second-stage units 72 shift each time slot while the first-stage units 70 are k-times slower and they shift each k time slot. The number of (clock-driven) cross points per inlet is $2\sqrt{n}$. Similarly, the number of cross points per outlet is $2\sqrt{n}$. The two-stage rotator of this embodiment still provides full access and is equivalent to a square rotator. It is noted that the standard space switch, with its randomly-operated cross points, cannot be implemented in the same fashion.

The control and architectural simplicity of the new switching network according to the present invention makes it an attractive alternative to existing designs. The arbitration problem inherent in the standard buffer-space-buffer network is avoided by the spatial disengagement of the destinations of the inlet packets. The packets of each connection are guaranteed delivery in the order at which they enter the switch. With a 2:1 speed expansion, the network becomes strictly non-blocking. This simplifies the admission control which would depend only on the states of the inlet-outlet pairs of interest. The delay experienced by the ATM streams is negligibly small, even at full occupancy of all inlets. In the hybrid implementation, the ATM/STM boundary is flexible and is not an engineering parameter.

Analysis

In the following discussion, a variety of stages of mathematical treatments are omitted for the sake of clarity. However, the discussion is believed to be sufficient to aid understanding of the invention. The conclusions are accurately verifiable in extensive simulations. The delay encountered by a packet is divided into two kinds: the fixed delay and the variable delay. The fixed delay is preset and has been discussed earlier by use of the expression "switching delay" which, for a given inlet/outlet pair, is constant. The variable delay may be further divided into two components. The first component is the inlet buffer delay—the delay from the instant a packet arrives at an inlet queue until it reaches the head of the queue. The second is the access delay—the delay from the instant it reaches the head of the inlet queue until it is served (written) to a packet buffer. The access delay determines the holding (service) time and hence the throughput and delay in the inlet queue. The delay in the packet buffer is constant for a given connection (inlet/outlet pair).

A packet which arrives at the head of the inlet queue and tries to proceed to a packet buffer for the first time is called a "fresh" packet. If it finds its intended location full, it loses its turn and becomes a "stale" packet. The arrival process of the fresh packets and the state of the packet buffers are uncorrelated.

The pure ATM operation is dealt with first. The fresh packets at the heads of the inlet queues aim at several outlets. Each outlet can only receive one packet during a time slot (focussing now on the case of no expansion), and its throughput is r. r is also the mean occupancy per inlet and equals (the number of inlets) times (the mean inlet-outlet traffic per time slot). The destinations of the fresh packets at the heads of the inlet queues are independent. Hence, the system must behave as n independent M/D/1 queues (this observation was made earlier in a similar context by Karol et al in IEEE Transactions on Communications, Vol. COM 35, No. 12, Dec. 1987, pp. 1347–1356).

The mean value of the access (service) delay in each of the M/D/1 queues is then $$d = \rho/(2-2\rho) \tag{1}$$

The inlet buffer delay is heavily dependent on the packet-arrival process, e.g. the nature of the input streams being smooth (Geo/G/1 queue), bursty ($M_B$/G/1 queue) or random (M/G/1 queue). It can be shown that the mean values of the packet's inlet buffer delay and the total variable delay are respectively:

For the smooth streams, $$W_{Geo/G/1} = \rho^2/[(2-4\rho+\rho^2)(1-\rho)] \tag{2}$$

$$W_1 = W_{Geo/G/1} + d \tag{3}$$

For the bursty streams, $$W_B = W_{Geo/G/1}[1/2 + \rho/4 + (1-\rho/4)B_2/B_1) \tag{4}$$

$$W_2 = W_B + [(B_1+B_2)/2B_1]d \tag{5}$$

where $B_1$ and $B_2$ are the first and second moments respectively of the random burst-length b ($B_1 = <b>$ and $B_2 = <b2>$)

For the random streams, where $B_1 = B_2 = 1$, then $$W_B = (3/2)W_{Geo/G/1} \tag{6}$$

$$W_3 = W_B + d \tag{7}$$

For ATM/STM operation, the mean value of the total variable delay can also be calculated in a similar manner. The following treatment is limited to the case of large n (the number of inlet or outlet). When the circuit content (circuit occupancy) is α, the probability of finding any packet buffer busy is $(\alpha + \rho/2)$, which is the probability that a fresh packet misses its turn. Note that the STM cells are "permanently" resident for a call duration which can be several orders of magnitude larger than a packet duration. By contrast, the average residence of an ATM packet in a packet buffer is $(\rho/2)(n-1)$. Since the packet buffer locations occupied by STM packets are not altered by the ATM traffic, the probability that a fresh or stale packet encounters an STM-occupied cell is It is assumed that the STM-assigned cells are scattered at random in the $n^2$ space of the packet buffers. In fact, when the STM content is relatively low (e.g. $\alpha = 0.5$), it is possible to improve the opportunity for ATM by evenly spacing the STM cells. This reduces the occurrence of successively busy locations in the packet buffers, thus reducing the delay and increasing the capacity.

The throughput of less than 0.6 in the pure ATM operation is unacceptable. The inter-switch links cannot be restricted to such a low occupancy. Thus, an internal expansion must be used. With a temporal expansion of 2:1, the internal speed (of the buffers and rotators) is double the external link speed. This, in effect, reduces the internal occupancy to a maximum of 0.5. The expression above can be used to determine an upper bound of the delay by setting $\rho=0.5$; the delay determined as such corresponds to a mean occupancy of 0.5, while, in the expansion case, the maximum internal occupancy is 0.5 (when the external occupancy is unity). It may be noted that the delay unit is the internal time slot (half the external time slot).

Figure 7:
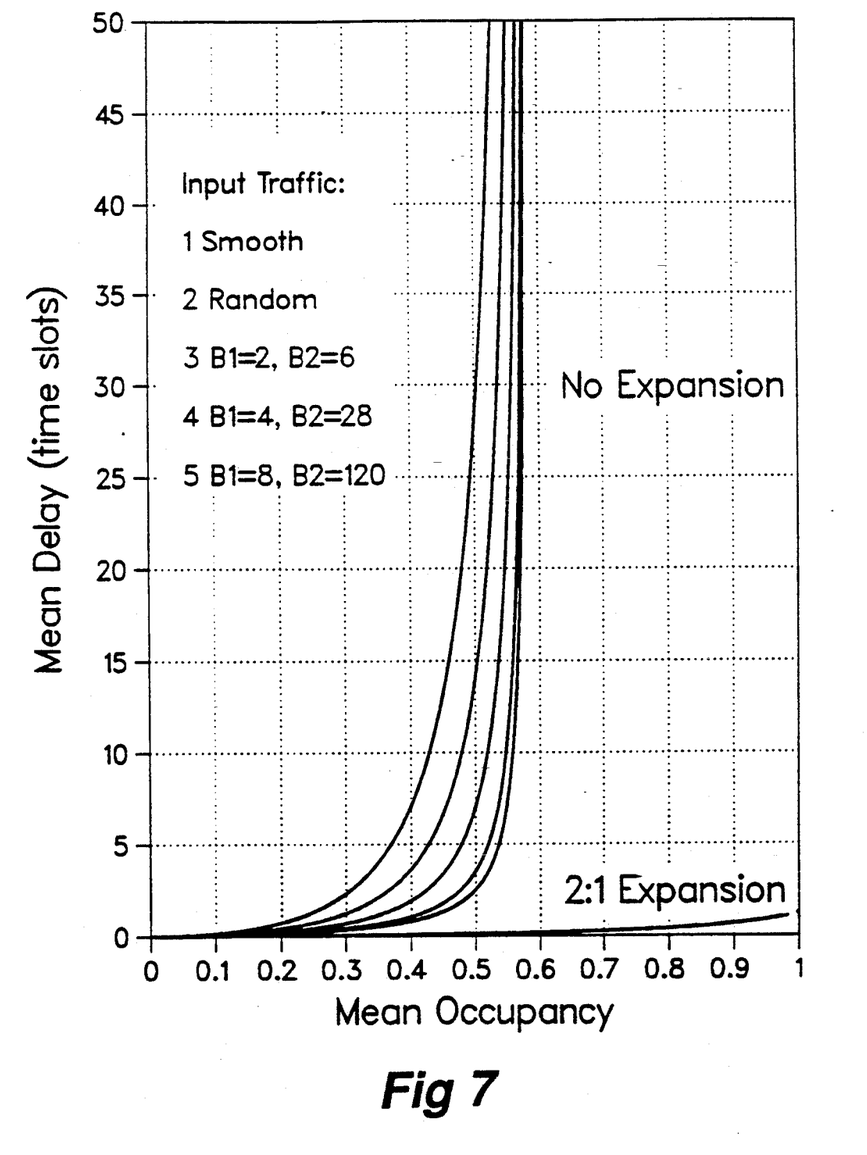
FIG. 7 is a graph showing a simulation result of load-service characteristics.
Figure 8:
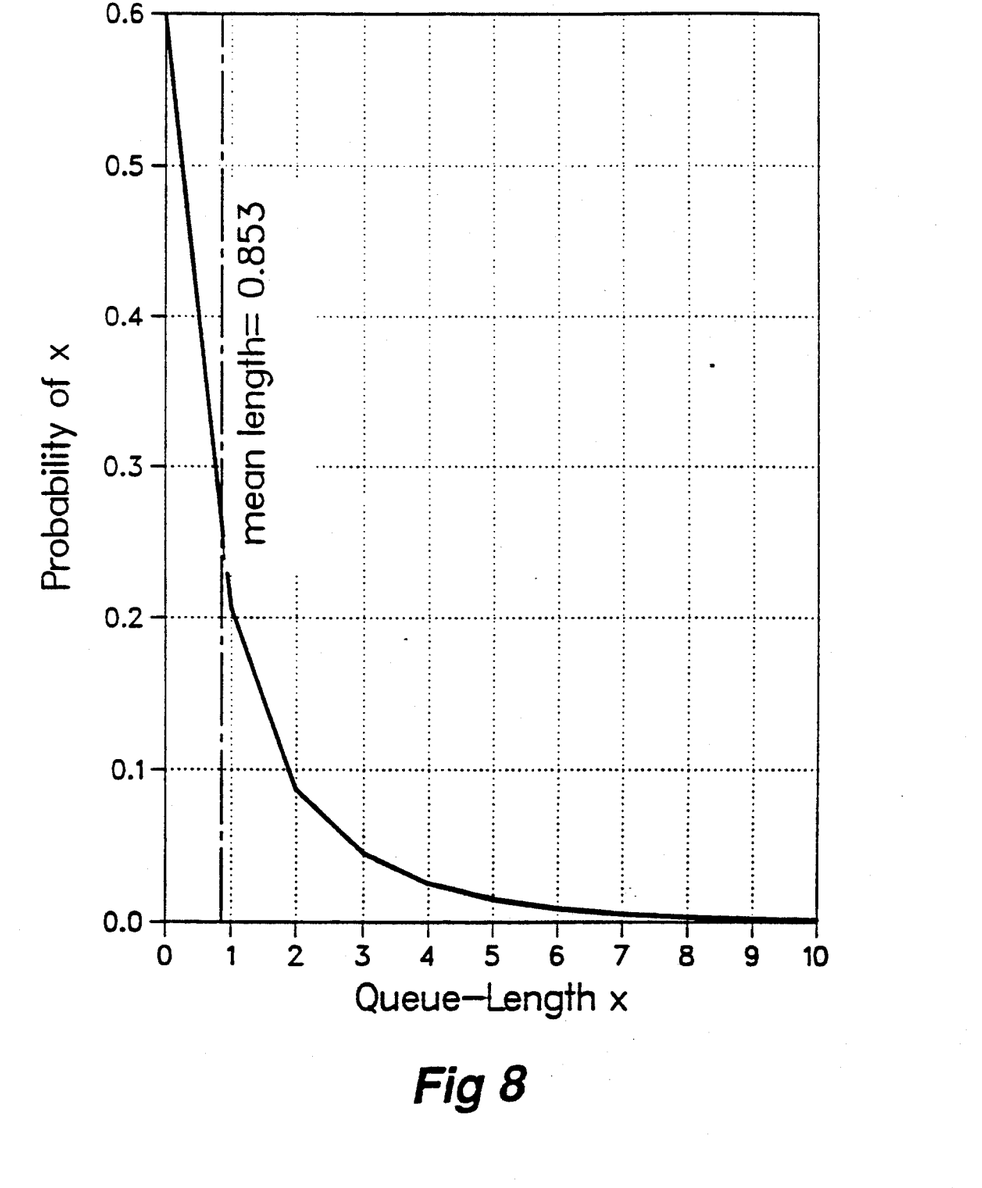
FIG. 8 is another graph showing the distribution of inlet-queue length, 2:1 expansion at full load, according to a simulation.

The delay-occupancy characteristics for the pure ATM operation, with no expansion and with a 2:1 temporal expansion, are shown in FIG. 7, where the delay unit is a time slot (packet duration). These are determined from expressions (3) and (5) above. Extensive simulation experiments show a good agreement with the analytical results. All simulation results are based on a $64 \times 64$ switch. In the expansion case, the analytical result serves only as an upper bound. Sample results are given in Table 1 below for the case of no expansion. In the bursty-traffic case, the burst-length has been selected to be geometrically distributed. Thus $B_2 = B_1(2B_1 - 1)$. Simulations show that the mean delay with a 2:1 expansion is consistently less than the analytical bound. The distribution of the inlet-queue length for the expansion case at full load ($\rho=1$) is shown in FIG. 8. The mean queue length is 0.853.

TABLE 1

Mean Delay (including head-packet delay)
Analytical and Simulation Results (No Expansion)
(95% confidence-interval of simulation results shown,
analytical results are in *italics*)

| | | Traffic Characteristics | |
|---|---|---|---|
| $\rho$ | Smooth | Random $B_1 = 1, B_2 = 1$ | Bursty $B_1 = 4, B_2 = 28$ |
| .40 | *0.810* 0.825 ± .017 | *1.048* 1.049 ± .024 | *4.619* 4.618 ± .276 |
| .45 | *1.324* 1.335 ± .023 | *1.781* 1.813 ± .043 | *7.880* 7.611 ± .447 |
| .50 | *2.50* 2.632 ± .064 | *3.5* 3.564 ± .125 | *15.5* 14.209 ± .714 |
| .55 | *7.169* 7.357 ± .348 | *10.449* 10.378 ± .504 | *46.221* 38.398 ± 2.644 |

Figure 9:
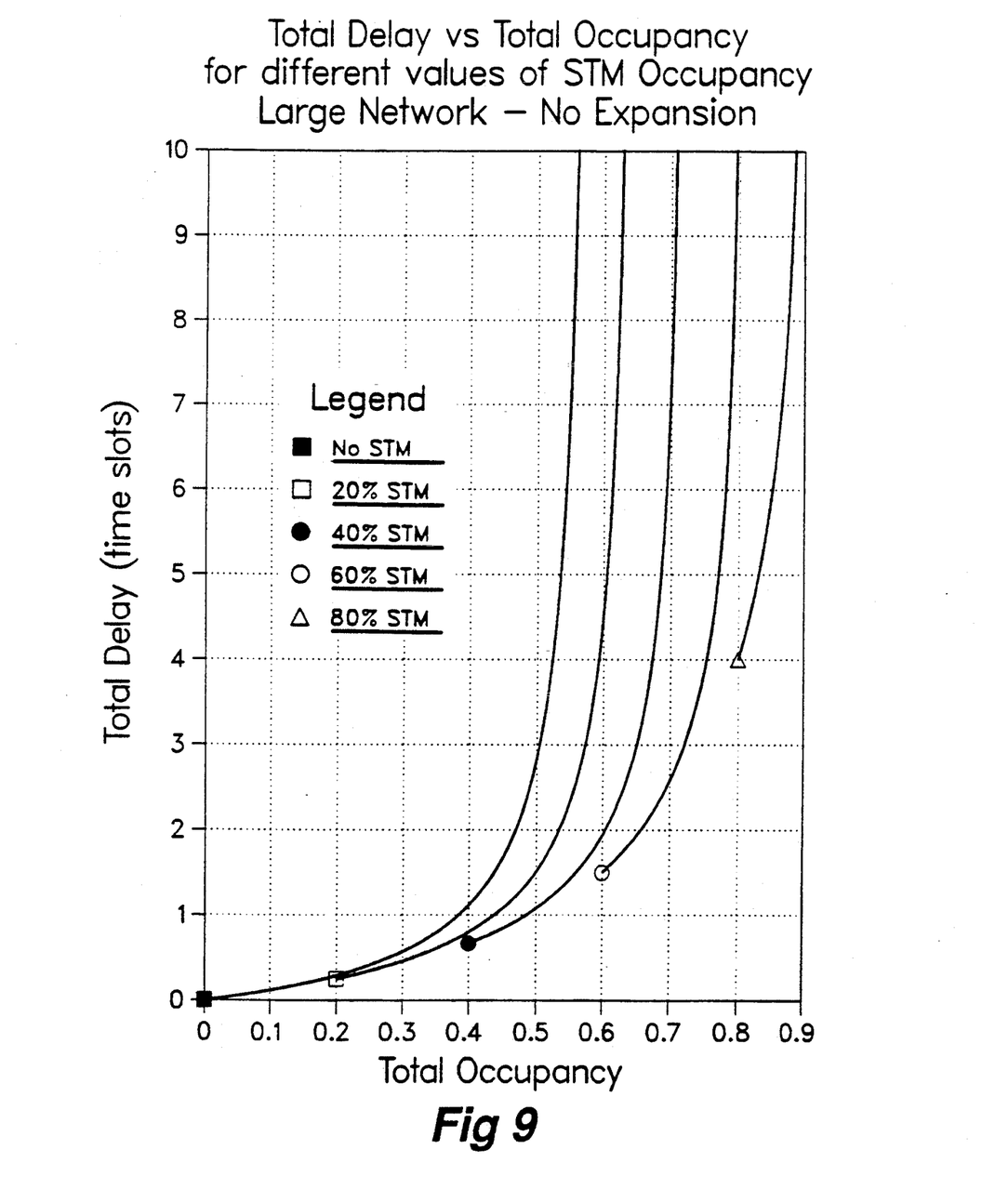
FIGS. 9 and 10 are graphs showing load service characteristics for STM/ATM operation.
Figure 10:
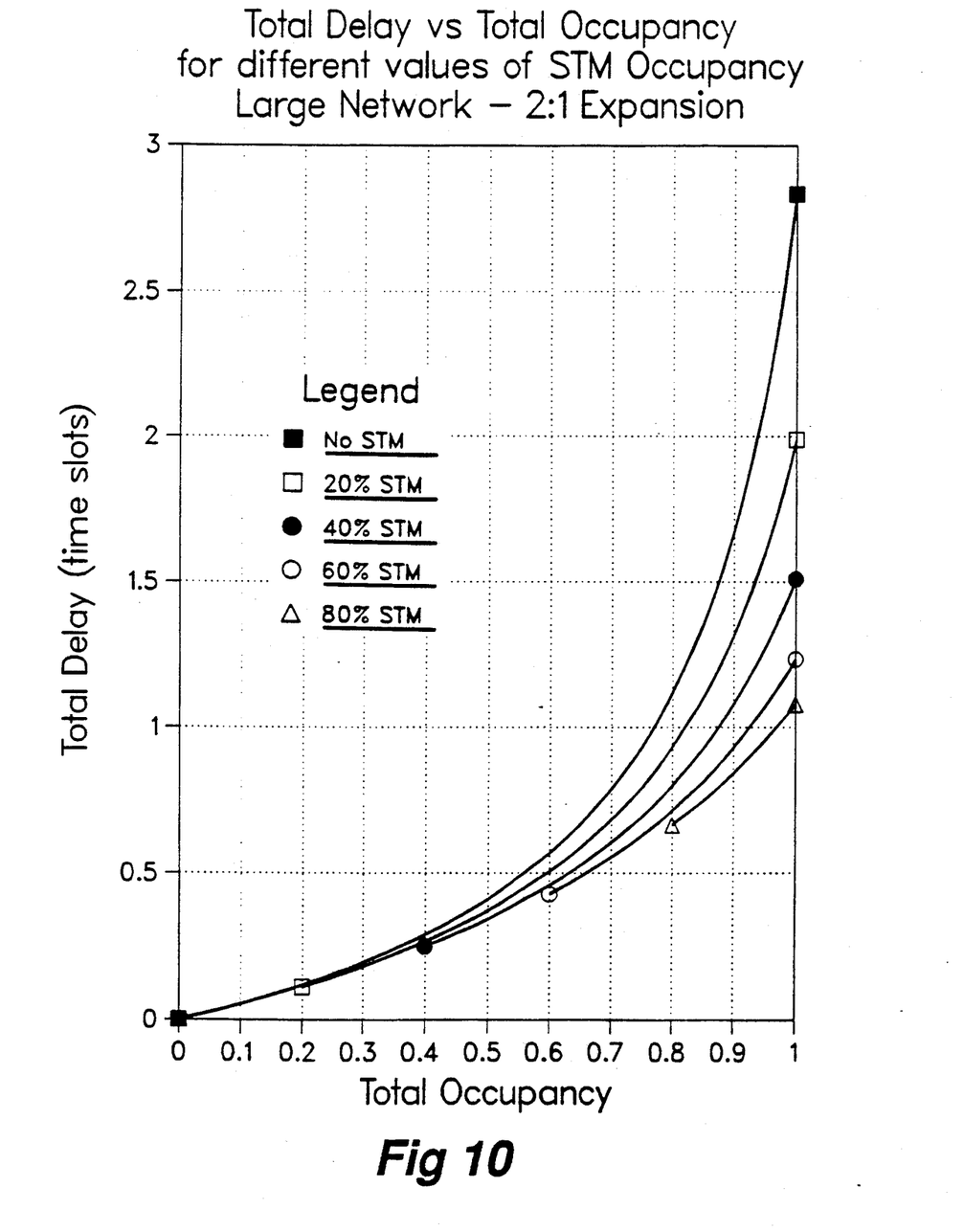

Analytical results for the ATM/STM operation, with random traffic, are shown in FIGS. 9 and 10 and Table 2 below. The expansion ratio for ATM increases as the circuit content increases. Let $\gamma$ be the overall expansion ratio ($\gamma=2$ in the present case). Then the effective ATM expansion ratio is:

$$e = (\gamma - \alpha)/(1 - \alpha) \quad (8)$$

Thus at a given total occupancy, the ATM delay decreases as the STM occupancy increases. FIGS. 9 and 10 show the total variable delay versus total occupancy for different values of STM occupancy in a large network, with no expansion (FIG. 9) and with a 2:1 temporal expansion (FIG. 10). Table 2 shows the traffic capacity of the switch according to the present invention as a function of the STM occupancy with no expansion.

TABLE 2

Total Throughput vs STM Occupancy
(No exansion)

| Number of Inlets | STM Occupancy | | | | |
|---|---|---|---|---|---|
| | 0.0 | 0.2 | 0.4 | 0.6 | 0.8 |
| 2 | .7427 | .7663 | .8076 | .8620 | .9268 |
| 4 | .6554 | .7023 | .7628 | .8339 | .9135 |
| 8 | .6187 | .6752 | .7438 | .8219 | .9078 |
| 10 | .6119 | .6701 | .7403 | .8197 | .9067 |
| 16 | .6018 | .6627 | .7350 | .8164 | .9051 |
| 64 | .5897 | .6537 | .7287 | .8124 | .9032 |
| 100 | .5883 | .6527 | .7280 | .8120 | .9030 |
| 128 | .5877 | .6523 | .7277 | .8118 | .9029 |
| 256 | .5868 | .6515 | .7272 | .8115 | .9028 |

We claim:

1. A packet switching system for switching data contained in packets among m inlets and n outlets, m and n being integers, comprising:
   m inlets, each having an input buffer;
   p packet buffers, p being an integer and each of said p packet buffers having n buffer locations, each of which is able to hold one or more packets;
   an input rotator cyclically connecting said m inlets and said p packet buffers;
   n outlets, each having an output buffer; and
   an output rotator cyclically connecting said p packet buffers and said n outlets, the $i^{th}$ outlet being only connected to the $i^{th}$ buffer location of each of said p packet buffers, as said output rotator cyclically connects p packet buffers and n outlets, where $i=1$ to n.

2. The packet switching system, according to claim 1, wherein said input buffers comprise ATM input buffers and STM input buffers having STM control memories so that the packet switching system is operable in ATM mode as well as ATM/STM mode.

3. The packet switching system, according to claim 1, wherein said input buffers, output buffers, packet buffers and input and output rotators operate one packet at one time slot synchronously.

4. The packet switching system, according to claim 2, wherein said input buffers, output buffers, packet buffers and input and output rotators operate one packet at one time slot synchronously.

5. The packet switching system, according to claim 1, wherein said packet buffers operate slower than one packet at one time slot.

6. The packet switching system, according to claim 2, wherein said packet buffers operate faster than one packet at one time slot.

7. The packet switch system, according to claim 1, wherein $m=n=p$.

8. The packet switch system, according to claim 2, wherein $m=n=p$.

9. The packet switching system, according to claim 7, wherein each of said input and output rotators comprises two or more tandemly connected sets of $(k \times k)$ rotators where $k=\sqrt{n}$ in that the number of said $(k \times k)$ rotators in each set is k and one set operates k times faster than the other set.

10. The packet switching system, according to claim 8, wherein each of said input and output rotators comprises two or more tandemly connected sets of $(k \times k)$ rotators where $k=\sqrt{n}$ in that the number of said $(k \times k)$ rotators in each set is k and one set operates k times faster than the other set.

11. The packet switching system, according to claim 7, wherein said rotators comprise a single rotator which is time multiplexed to function as said input rotator at one time period and as said output rotator at another time period.

12. The packet switching system, according to claim 8, wherein said rotators comprise a single rotator which is time multiplexed to function as said input rotator at one time period and as said output rotator at another time period.

* * * * *